United States Patent [19]

Hutchison

[11] 4,423,719

[45] Jan. 3, 1984

[54] PARABOLIC TROUGH SOLAR COLLECTOR

[75] Inventor: Joseph A. Hutchison, Dallas, Tex.

[73] Assignee: Solar Kinetics, Inc., Dallas, Tex.

[21] Appl. No.: 407,106

[22] Filed: Aug. 11, 1982

Related U.S. Application Data

[63] Continuation of Ser. No. 136,828, Apr. 3, 1980, Pat. No. 4,240,406.

[51] Int. Cl.³ .......................... F24J 3/02; G02B 5/10
[52] U.S. Cl. .................................. 126/438; 350/293; 350/310
[58] Field of Search ................ 126/438, 439; 350/288, 350/293, 310

[56] References Cited

U.S. PATENT DOCUMENTS

| | | | |
|---|---|---|---|
| 1,814,897 | 7/1931 | Coxe | 126/438 |
| 2,182,222 | 12/1939 | Couris | 126/438 |
| 2,968,033 | 1/1961 | Kreitzberg | 350/292 |
| 4,135,493 | 1/1979 | Kennedy | 126/438 |
| 4,178,931 | 12/1979 | Hutchison | 350/293 |
| 4,240,406 | 12/1982 | Hutchison | 126/438 |
| 4,297,003 | 10/1981 | Hutchison | 350/292 |
| 4,372,027 | 2/1983 | Hutchison | 126/438 |
| 4,372,651 | 2/1983 | Hutchison | 350/292 |
| 4,373,783 | 2/1980 | Anderson | 350/292 |

FOREIGN PATENT DOCUMENTS

1110689  4/1968  United Kingdom ............... 350/310

*Primary Examiner*—Samuel Scott
*Assistant Examiner*—G. Anderson
*Attorney, Agent, or Firm*—John F. Booth; Gerald G. Crutsinger; Monty L. Ross

[57] ABSTRACT

An improved monocoque parabolic solar collector which can be machine welded or fastened with rivets, bolts or other mechanical fasteners without the need for any blind fastening systems.

14 Claims, 16 Drawing Figures

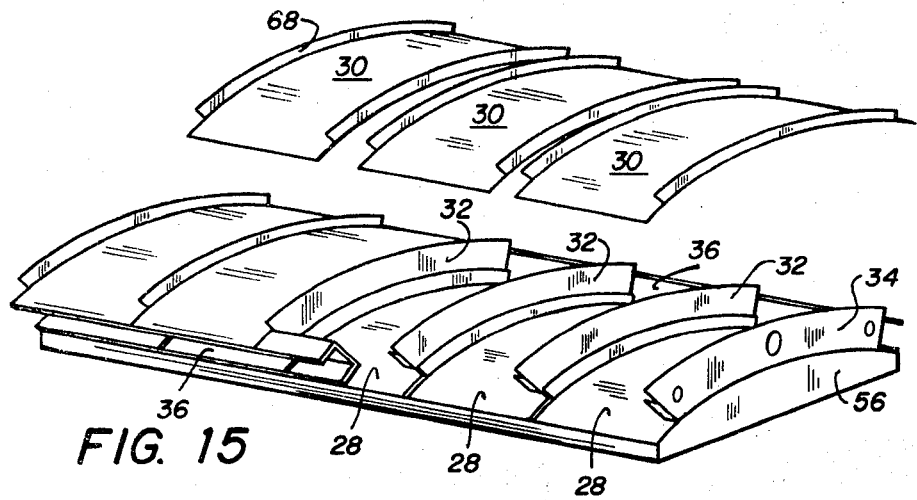
FIG. 15
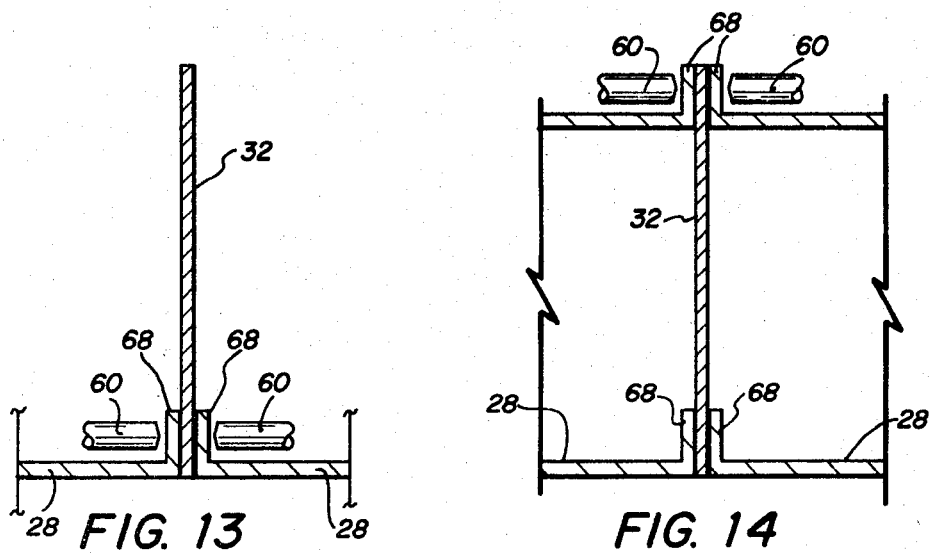
FIG. 13
FIG. 14
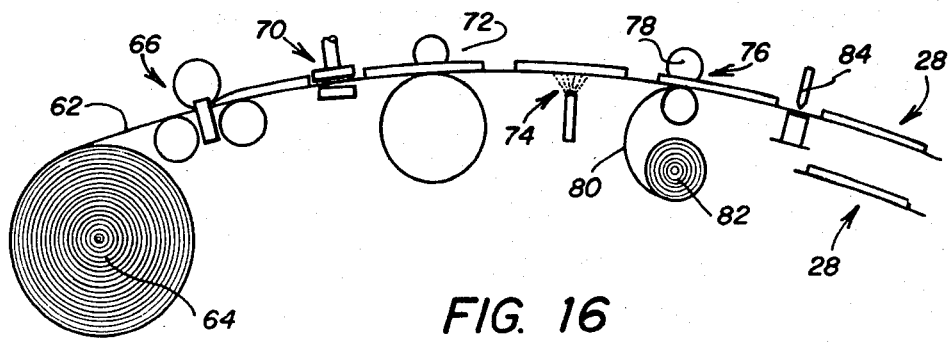
FIG. 16

PARABOLIC TROUGH SOLAR COLLECTOR

This application is a continuation, of application Ser. No. 06/136,828, filed 4/3/80, now U.S. Pat. No. 4,240,406.

TECHNICAL FIELD

The present invention relates to reflective trough-type solar collectors and more particularly to an improved monocoque construction process for making novel parabolic trough solar collectors. Another aspect of the invention relates to a method for fabricating parabolic monocoque solar collectors without the need for blind fastening systems or manual surface welding techniques.

BACKGROUND OF THE INVENTION

A variety of systems are now available for converting solar energy into other forms of energy which can be more readily used or stored. These systems typically employ a solar collector which collects solar radiation and converts it into a more useable form of energy such as heat. Solar collectors of the flat plate type have been utilized in low energy applications such as heating water, generating low pressure steam, supplementing air conditioning and heating systems, and the like. Flat plate collectors do not focus the sun's radiation and have limited applicability. Another type of collector is generically called a concentrating collector. These collectors focus or concentrate the sun's radiation energy in a particular area. Concentrating collectors can be designed to operate at high temperatures with reasonable flow rates, thus substantially increasing the versatility of systems incorporating these collectors over systems employing flat plate collectors.

One type of concentrating collector is the parabolic trough collector. This type collector uses an elongated reflective trough having a parabolic cross-section to concentrate the sun's radiation along a focal line extending through the focal points of the parabolic elements of the trough. A conduit can be positioned along this focal line and a heat transfer liquid can be circulated through the conduit, where it wil be heated by the sun's energy. Satisfactory flow rates at high temperatures can be obtained from these collectors. It has also been found that by use of tracking systems these parabolic trough collectors can become extremely efficient as they follow the movement of the sun. Designs for these collectors are disclosed, for example, in U.S. Pat. Nos. 3,959,056; 4,011,858; 4,098,264; 4,135,493; 4,178,913; and application Ser. No. 853,213 filed Nov. 21, 1977, now U.S. Pat. No. 4,240,406.

Trough type collectors are becoming accepted as the most efficient and versatile means of generating energy from solar radiation. As solar systems are used to satisfy larger energy requirements, the systems incorporating the collectors become physically larger. Presently, systems employing a plurality of collectors whose aggregate collector surface approaches a thousand square meters are in use. These systems have been used as solar collectors in systems for irrigation pumping; solar heating and air conditioning; steam generation for raw crude oil processing and other industrial applications; generating electrical energy directly from photovoltaic cells; and powering small power plants.

Conventionally, trough type solar collectors have been supported on an axis extending parallel to the focal line. These collectors are journaled by bearings to rotate to point the reflector surface directly toward the sun. Two pylons or supports can be rigidly mounted to support the individual collectors in a rotatable position elevated from the surface of the ground.

To achieve the collector areas required for some applications, a plurality of collectors of a size approximately 6 meters long and 2½ meters wide have been utilized in conventional systems. These collectors are mounted in an array or field. In some applications as many as six collectors are mounted on a common axis and are mechanically connected together so that all six collectors can be rotated to track the sun as a single unit. A plurality of these rows can be utilized to obtain the total collector area required for the particular application. Attempts have been made to lower the cost per unit area of support equipment such as the tracking units for each row by increasing the length of the row. The benefits of these attempts have been offset by the torsional flexibility added to the system by increasing the overall length of an interconnected row of collectors and thus increasing the length to width ratio. This flexibility creates problems in focusing the collectors and in preventing damage to the system during high winds. Stiffening the individual collector units themselves by conventional means substantially increases the manufacturing costs. Difficulties have been encountered in attempting to increase the width of the collectors substantially beyond the 2½ meter range due to manufacturing, structural, transportation and handling problems casued by a unit of such a size.

One attempt to solve this problem is disclosed in co-pending Application U.S. Ser. No. 06/086,314, filed Oct. 19, 1979. That application discloses a parabolic trough solar collector which is constructed in modular form and which, in the preferred embodiment, is constructed from three separate modules extending the length of the collector. Each module employs a monocoque stressed-skin construction concept similar to that disclosed in application Ser. No. 853,213 filed Nov. 21, 1977, now U.S. Pat. No. 4,240,406. The internal surfaces of the individual modules are interconnected to form a single parabolic reflector.

However, even the improved parabolic trough solar collectors disclosed in that application require hand fastening of the monocoque structures by use of blind rivets, manual surface welding techniques, or the like. To facilitate the rapid, uniform and efficient production of parabolic trough solar collectors, a new design and method of manufacture are therefore needed that will eliminate the need for any blind fastening systems within the monocoque modules.

Another porblem encountered in manufacturing parabolic solar collectors having large dimensions relates to the size of the panels of reflective material that are utilized to form the reflective interior surfaces of the collectors. Thus, for example, the use of large panels of reflective material in solar collectors increases both the cost of manufacture and the cost of repair in the event that such panels are damaged during transportation or installation, or even later, during use. A parabolic solar collector design is therefore needed that employs smaller panels of reflective material without sacrificing the rigidity or structural integrity that is also needed.

SUMMARY OF THE INVENTION

According to the present invention, a novel parabolic solar collector is provided that is fabricated without the need for any blind fasteners or blind fastening systems. More particularly, a monocoque parabolic solar collector is provided which can be welded or fastened with spot welds, seam welds, rivets, bolts or the like without the need for any blind fastening systems.

According to a preferred embodiment of the invention, a parabolic trough solar collector is provided that comprises at least one monocoque module further comprising a plurality of stressed parabolic channels fastened to and supported by a plurality of parallel parabolic bows. In another preferred embodiment of the invention, the parabolic channels and parabolic bows are fastened to and further supported by edge channels that are perpendicular to the ends of the parabolic bows and extend longitudinally down the edges of the module.

According to another embodiment of the invention, a parabolic trough solar collector is provided that comprises a monocoque stressed-skin center module longitudinally interconnected to two monocoque stressed-skin wing modules. In a particularly preferred embodiment of the invention, the exterior parabolic bows at the ends of the modules are adapted to receive and attach to an external system designed to support, handle or drive the interconnected modules.

According to another embodiment of the invention, a monocoque parabolic trough solar collector module is provided that comprises a plurality of panels of reflective material clamped to the surface of the interior parabolic mirror channels by a clamping means supported on the parabolic bows or edge channels.

According to another embodiment of the invention, a novel method is provided for manufacturing and assembling monocoque parabolic solar collectors that employs a fully automated fastening system. According to the method disclosed herein, the parabolic collectors are assembled and welded on a male mold fixture without the need for any blind fastening systems.

According to yet another embodiment of the invention, a method is provided for the continuous manufacture of the interior parabolic mirror channels and the exterior parabolic channels employed in the monocoque parabolic solar collectors of the invention.

The parabolic solar collectors disclosed herein represent a significant and unexpected improvement over those disclosed in the prior art. More particularly, the subject collectors are stronger, more easily repaired, and more economically manufactured than those previously available. Furthermore, through use of the process of the invention, the subject collectors can be manufactured at throughput rates previously thought unattainable. Such throughput rates are made possible by the novel design and assembly technique of the invention which eliminate the need for any blind fasteners or manual surface welding.

All of the attendant advantages and features of the present invention can be appreciated by referring to the details of the present invention as shown in the accompanying drawings and as described in the detailed description herein.

BRIEF DESCRIPTION OF THE DRAWINGS

For a more complete understanding of the present invention and the advantages thereof, reference is now made to the following description taken in conjunction with the accompanying drawings in which:

FIG. 13 is a detail section view showing two electrodes welding two interior parabolic mirror channels to an interior parabolic bow;

FIG. 14 is a detail section view showing two electrodes welding two exterior parabolic channels to the interior parabolic bow of FIG. 13;

FIG. 15 is a perspective view of the male mold fixture of FIG. 12 showing all parabolic bows fastened to the interior parabolic mirror channels and fastened to two of five exterior parabolic channels; and FIG. 16 is a simplified schematic view of a continuous sheet-metal line for forming the parabolic channels employed in the monocoque stressed-skin trough solar collectors of the invention.

DETAILED DESCRIPTION OF THE INVENTION

Figure 1:
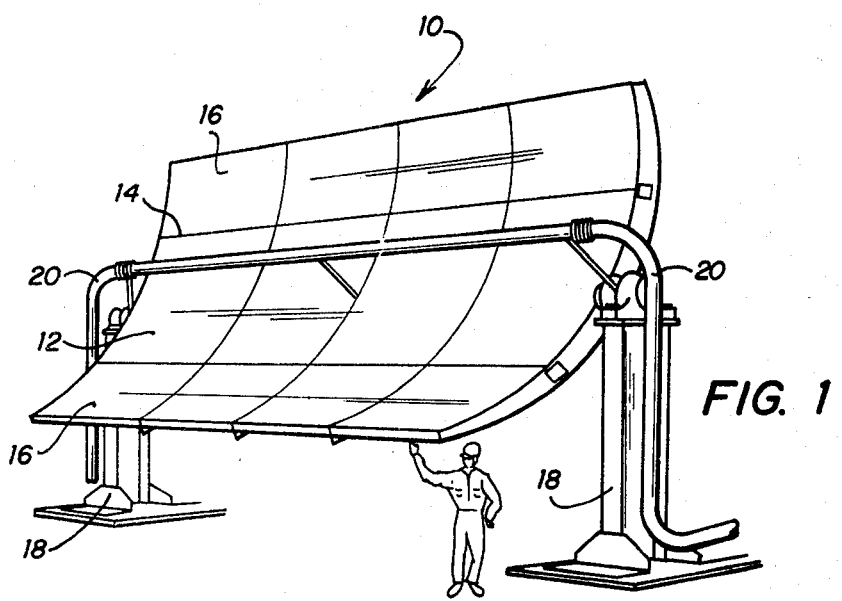
FIG. 1 is a perspective view of one embodiment of the parabolic trough solar collector of the invention which comprises a monocoque stressed-skin center module longitudinally interconnected to two monocoque stressed-skin wing modules.

By referring to the drawings, the details and advantages of the present invention will be described. Reference numerals will be used during the description to indicate parts or portions of the apparatus and process of the present invention. Throughout these views, like reference characters will be used to designate like and corresponding parts in various views.

Referring to FIG. 1, the novel parabolic solar collector of the invention is illustrated and is identified generally by reference numeral 10. In the embodiment illustrated, the parabolic solar collector 10 is of the preferred parabolic trough type but it is to be understood, of course, that other reflector shapes can also be utilized within the scope of the invention. Parabolic solor collector 10 further comprises a monocoque stressed-skin center module 12 longitudinally interconnected along lines 14 to two monocoque stressed-skin wing modules 16. As used herein, the "monocoque stressed-skin module" refers to a module wherein the skin or covering absorbs or carries all or a large part of the stresses to which the module is exposed. Parabolic solar collector 10 is supported by pylons 18, which also support conduit 20. Conduit 20 is positioned along the focal line of parabolic solar collector 10 so as to heat a circulating fluid passing therethrough.

Figure 2:
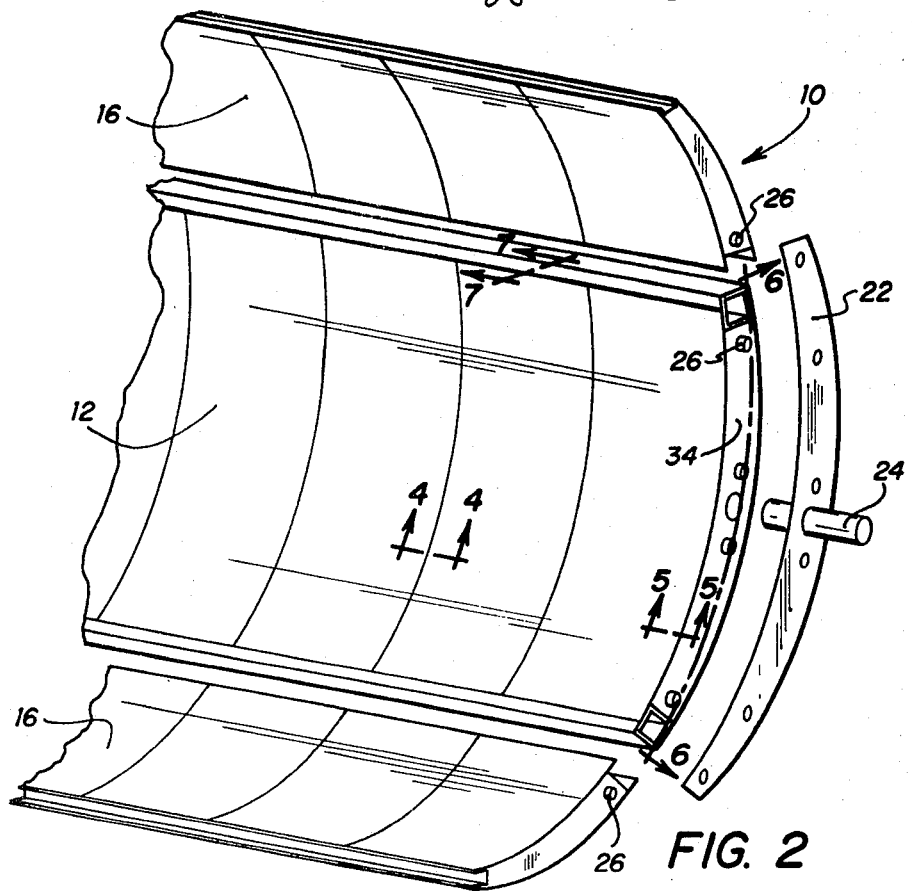
FIG. 2 is an exploded detail view of one end of the parabolic trough solar collector of the invention showing a center module, two disconnected wing modules, and a torque transfer arm.

In FIG. 2, a portion of parabolic solar collector 10 is illustrated in an exploded view with wing modules 16 disconnected from center module 12. Also shown is torque transfer arm 22 which is adapted to operably engage center module 12 and wing modules 16 by means of drive pin 24 and fasteners 26. It will be readily apparent to those of ordinary skill in the art that drive pin 24 of torque transfer arm 22 can also be attached to any of the well-known conventional driving or tracking mechanisms designed for use with such systems.

Figure 3:
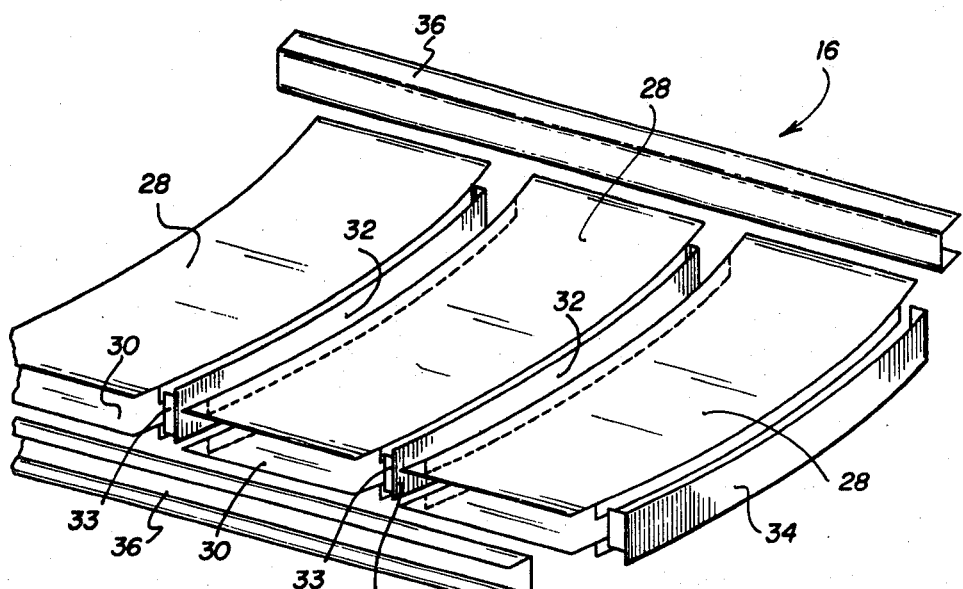
FIG. 3 is an exploded detail view of a portion of one parabolic monocoque stressed-skin module of the invention showing three interior parabolic mirror channels, three exterior parabolic channels, three parabolic bows and two edge channels.

FIG. 3 is an exploded detail view of a portion of one wing module 16 shown in FIGS. 1 and 2. The portion of wing module 16 shown in FIG. 3 further comprises three interior parabolic mirror channels 28, three exterior parabolic channels 30, two interior parabolic bows 32, with tabs 33 thereon, exterior parabolic bow 34 and two edge channels 36. Tabs 33 can be welded to the edge channels 36. When assembled according to the method of the invention, the elements of wing module 16 shown in FIG. 3 form a monocoque stressed-skin module having exceptional strength and rigidity.

Figure 4:
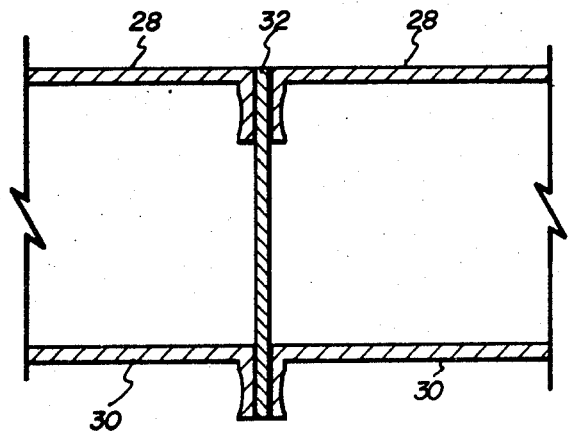
FIG. 4 is a detail section view taken along line 4—4 of FIG. 2, showing portions of two interior parabolic mirror channels and two exterior parabolic channels that are resistance welded to an interior parabolic bow.
Figure 5:
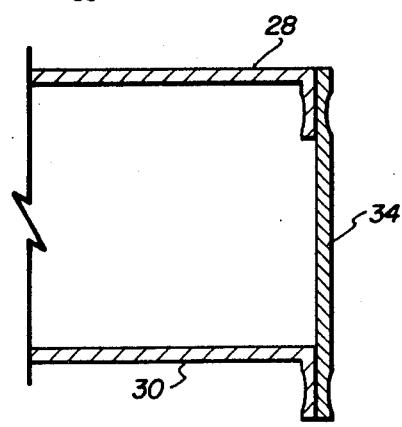
FIG. 5 is a detail section view taken along line 5—5 of FIG. 2 showing portions of one interior parabolic mirror channel and one exterior parabolic channel that are welded to an exterior parabolic bow.

FIGS. 4 and 5 are detail section views illustrating a preferred manner in which some of the elements of wing module 16 shown in FIG. 3 can be connected in forming the monocoque stressed-skin structure. More particularly, FIG. 4 depicts portions of two interior parabolic mirror channels 28 and two exterior parabolic channels 30 that have been resistance welded to interior parabolic bow 32. Similarly, FIG. 5 depicts a detail section view wherein interior parabolic mirror channel 28 and exterior parabolic channel 30 have been welded to exterior parabolic bow 34. The collector is described herein as being fabricated by use of resistance welds. It is to be understood that this includes spot welding, seam welds and the like and that other fastening means could be used.

Figure 6:
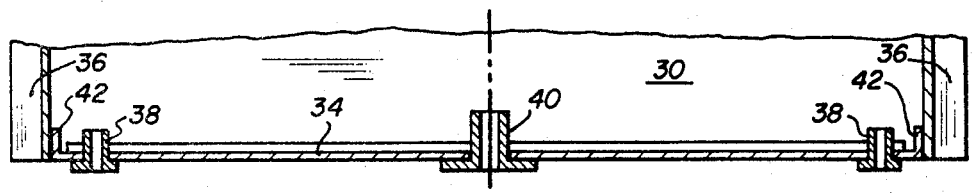
FIG. 6 is a detail section view taken along line 6—6 of FIG. 2 showing an exterior parabolic bow that is adapted to receive a torque transfer arm or other assembly for fabricating, shipping, installing or driving the module.

FIG. 6 depicts an exterior parabolic bow similar to that disclosed as a part of center module 12 in FIG. 2 which is adapted to receive and engage a torque transfer arm similar to torque transfer arm 22 shown in FIG. 2. As modified, exterior parabolic bow 34 comprises inserts 38 and drive socket 40 designed to receive fasteners 26 and drive pin 24 shown in FIG. 2, respectively. Exterior parabolic bow 34 further comprises lips 42 that are fastened by means of resistance welds or the like to edge channels 36.

Figure 7:
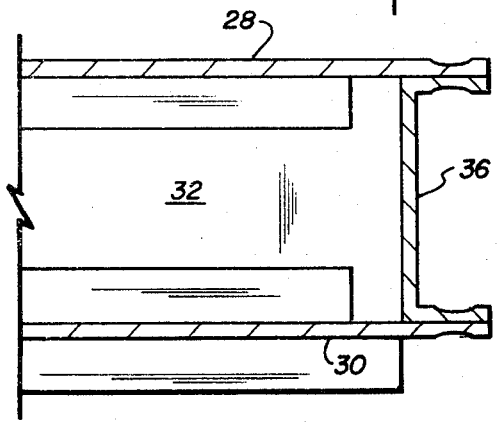
FIG. 7 is a detail section view taken along line 7—7 of FIG. 2 showing portions of one interior parabolic mirror channel and one exterior parabolic channel that are welded to an edge channel.

FIG. 7 is a detail section view taken along line 7—7 of FIG. 2 illustrating the manner in which portions of interior parabolic mirror channel 28 and exterior parabolic channel 30 are welded to edge channel 36 in forming a monocoque stressed-skin module for use in the parabolic solar collectors of the invention.

Figure 8:
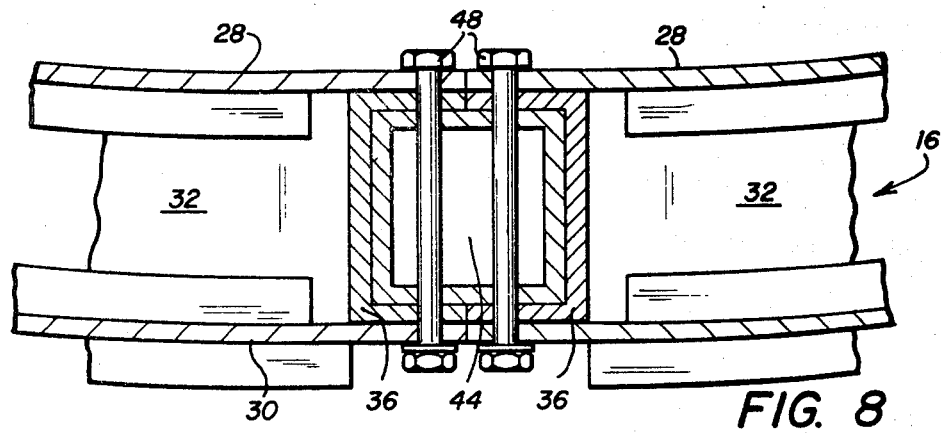
FIG. 8 is a detail section view looking longitudinally down the interconnection between two monocoque stressed-skin modules showing a preferred method for connecting the two modules.

FIG. 8 illustrates a preferred method for interconnecting a center module 12 and wing module 16 along their abutting edges. As shown in FIG. 8, center module 12 and wing module 16 further comprise interior parabolic mirror channels 28, exterior parabolic channels 30, interior parabolic bows 32, and edge channels 36. The concave portions of edge channels 36 form elongated sockets extending the length of the modules. When the modules 12 and 16 are placed with their edges abutting, a chamber 44 is formed by the sockets in channels 36. In the embodiment illustrated, rectangular tubing 46 has a cross-sectional size and shape to fit inside chamber 44. Suitable bores are formed in modules 12 and 16 for receiving edge channel fasteners 48 therethrough. As seen in FIG. 8, edge channel fasteners 48 extend through interior parabolic mirror channels 28, edge channels 36, rectangular tubing 46, chamber 44, and exterior parabolic channels 30 to rigidly interconnect center module 12 and wing module 16. The bores for edge channel fasteners 48 can be predrilled and prealigned at the site of manufacture of the modules and can be inserted at the installation site, allowing transportation of the modules in the unassembled form.

Figure 9:
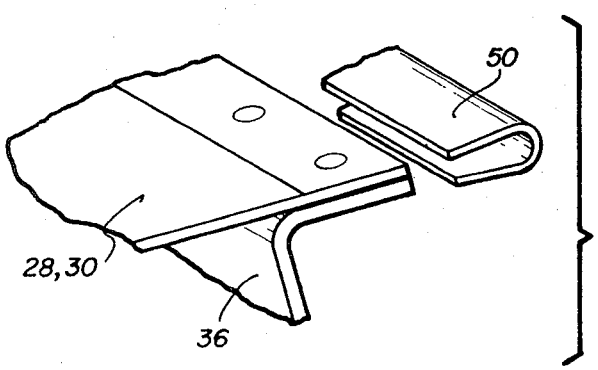
FIG. 9 is an exploded detail view showing a portion of the outer edge of a wing module.

FIG. 9 illustrates the manner in which a U-shaped clip 50 can be attached to fit over the exposed edges that are formed when an interior parabolic mirror channel 28 or exterior parabolic channel 30 is attached to edge channel 36 on the edge of wing module 16 which does not abut another module such as center module 12 shown in FIGS. 1, 2 and 8. A suitable potting or sealing compound can be placed inside of U-shaped clip 50 so that the exposed edges are sealed when the clip is in place. Preferably, U-shaped clip 50 is formed in a shape to resiliently grip the extending edges of the module on which it is employed.

Figure 10:
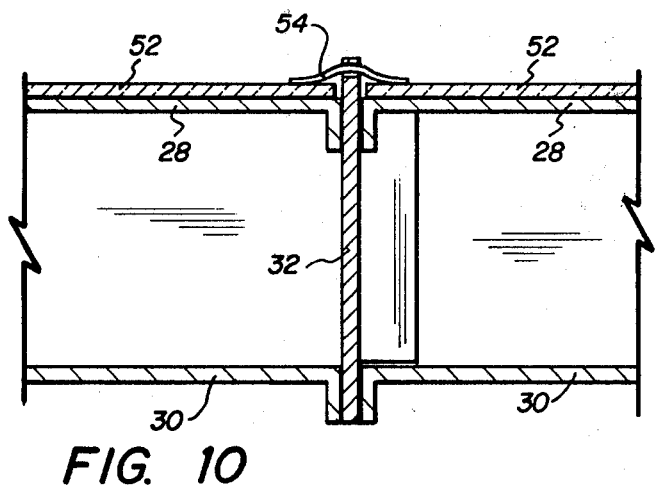
FIG. 10 is a detail section view showing a method for clamping reflective material to two interior parabolic mirror channels by means of a clamping mechanism operably attached to an interior parabolic bow protruding past the mirror surface.

FIG. 10 depicts an alternate embodiment of the structure shown in FIG. 4 wherein reflective panels 52 are fastened to interior parabolic mirror channels 28 by clamping means 54 supported on protruding interior parabolic bow 32. A satisfactory clamping means 54 for use in this embodiment is a spring clip which can be introduced through a slot in interior parabolic bow 32 to provide for a downward mechanical clamping force on reflective panels 52.

While the novel parabolic solar collector of the invention has been described above in the context of a most preferred embodiment, it will be apparent to one of ordinary skill in the art upon reading this disclosure that various minor modifications to the preferred embodiments can be effectuated without departing from the scope of the invention.

It is to be further understood that although the improved collector structure of the present invention is described by use of a modular parabolic collector, that the invention has application in nonmodular collectors. For example, the center module 12 could be constructed as a complete collector without the wing modules 16.

Figure 11:
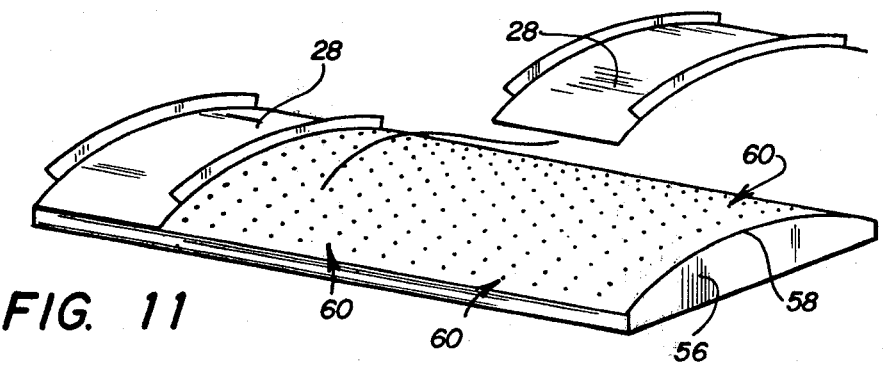
FIG. 11 is a perspective view of a male mold fixture useful for manufacturing the monocoque stressed-skin parabolic trough collector modules of the invention according to the method of the invention.
Figure 12:
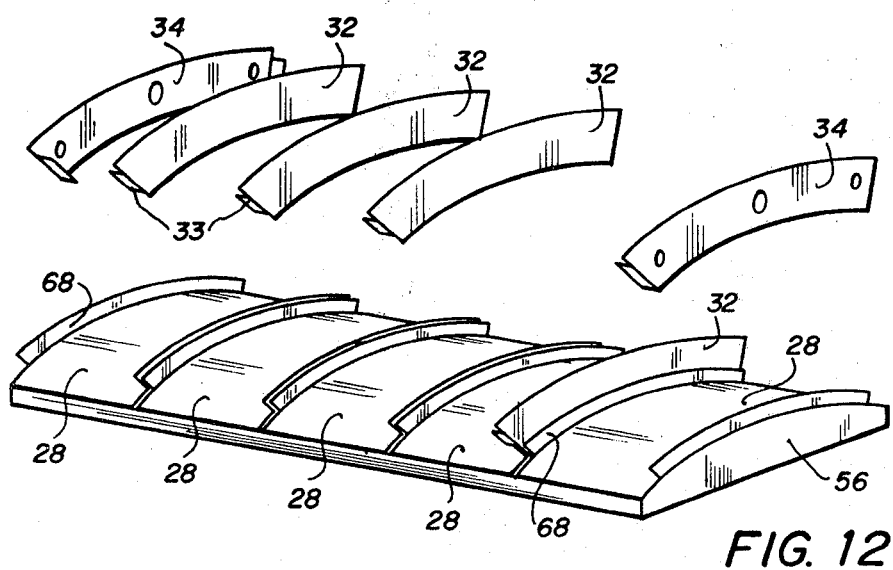
FIG. 12 is a perspective view of the male mold fixture of FIG. 11 wherein a plurality of interior parabolic mirror channels are positioned on said male mold fixture in such manner that a parabolic bow can be inserted between each of said channels and affixed thereto.

According to one process of the invention, the modules of the subject parabolic solar collectors are assembled on a male mold fixture 56 as shown in FIG. 11. Male mold fixture 56 comprises a parabolic upper surface 58 having distributed thereon a plurality of small holes 60 which communicate with a vacuum manifold to provide suction for holding interior parabolic mirror channels 28 firmly against the surface of male mold fixture 56 during assembly of the monocoque stressed-skin modules disclosed above. According to the assembly process, a plurality of interior parabolic mirror channels 28 are positioned on male mold fixture 56 as shown in FIG. 12 and stretched so as to form fit the surface of interior parabolic mirror channels 28 to the mold. Interior parabolic bows 32 and exterior parabolic bows 34 are then positioned on either side of interior parabolic mirror channels 28 in preparation for fastening thereto as shown in FIGS. 12–15. Interior parabolic bows 32 and exterior parabolic bows 34 can be fastened to interior parabolic mirror channels 28 by welding with electrodes 60 as shown for interior parabolic bow 32 in FIG. 13. Seam welding of this same joint can also be accomplished by means of a seam welding roller or other mechanical fasteners such as screws, bolts, and rivets.

Once all interior parabolic mirrors channels 28, interior parabolic bows 32 and exterior parabolic bows 34 have been fastened into an integral unit, edge channels 36 are fastened to channels 28, tabs 33 of interior parabolic bows 32 and lips 42 on exterior parabolic bows 34. Exterior parabolic channels 30 can next be similarly stressed and fastened to channels 36, interior parabolic bows 32 and exterior parabolic bows 34 as shown in FIG. 15. A detail section view showing two electrodes 60 spot welding two exterior parabolic channels 30 to an interior parabolic bow 32 is provided in FIG. 14. Exterior parabolic channels 30 can also be fastened to parabolic bows 32, 34 by any of the means previously disclosed for fastening interior parabolic mirror channel 28.

It is significant that the process disclosed above for assembling the monocoque stressed-skin modules eliminates the need for any blind fastening systems. As a result, the modules comprising the parabolic solar collectors of the invention can now be fabricated and assembled on a fully automated production line at throughput rates significantly higher and unit costs significantly lower than those previously experienced in the industry.

According to yet another embodiment of the invention, a process or method is disclosed in FIG. 16 for forming the interior parabolic mirror channels 28 utilized above in making the monocoque stressed-skin modules. Looking at FIG. 16, sheet metal 62 is payed off from uncoiler 64 into roll forming machine 66 where the parabolic shape and channel return edge 68 (also shown in FIGS. 12–15) is formed by a modulating roller which repeats a 90 degree parabola. The parabolic channel return edge 68 is notched away in the 90 degree area of the parabola by cutter 70. The sheet metal surface to become the reflective substrate is cleaned with mechanical scrubbing action by brush roller 72 and is then sprayed with cleaning solution 74. Laminating device 76 with pinch rollers 78 provides for attachment of a reflective laminate material 80 which is payed off of continuous roller 82. Repeated interior parabolic mirror channels 28 are then separated by shear 84 and delivered to the end of the line. Exterior parabolic channels 30 are similarly formed, except that the steps of preparing the reflective surface and laminating the reflective material thereto and not required. Furthermore, as previously discussed in relation to FIG. 10, alternative methods of attaching a reflective panel to interior parabolic mirror channels 28 may be employed, and in those cases, the liminating step described with reference to FIG. 16 is not needed.

Finally, while the foregoing detailed description has primarily focused on a parabolic trough embodiment of the subject invention, it is understood that the concepts disclosed herein may be applied to parabolic dish collectors as well. In the case of the parabolic dish or other solar reflectors such as heliostats where the three dimensional contours are required, a stamped shape is preferred for the channel section. Stamped sheet metal is also a preferred material for use in forming the parabolic bows utilized in the monocoque stressed-skin modules.

It is to be appreciated, of course, that the present invention is illustrated and described by reference to preferred embodiments and that numerous alterations and modifications thereof can be made without departing from the spirit and scope of the invention.

I claim:

1. A parabolic solar collector comprising at least one monocoque stressed-skin module further comprising a plurality of stressed-parabolic channels fastened to and supported by a plurality of parallel parabolic bows, said stressed parabolic channels further comprising at least one interior parabolic mirror channel and at least one exterior parabolic channel, at least one of said stressed parabolic channels further comprising a central parabolic surface having a channel return edge disposed in perpendicular relation to each curved edge of said parabolic surface, each said channel return edge being in facing contact with and connected to a parabolic bow.

2. The apparatus of claim 1 wherein the parabolic channels and parabolic bows are fastened to and further supported by edge channels that are perpendicular to the ends of said parabolic bows and extend longitudinally along the edges of said module.

3. The apparatus of claim 2 wherein said parabolic solar collector is a parabolic trough.

4. The apparatus of claim 3 wherein said parabolic trough comprises two such monocoque modules.

5. The apparatus of claim 3 wherein said parabolic trough comprises three such monocoque modules.

6. The apparatus of claim 5 wherein said parabolic trough comprises a monocoque stressed-skin center module longitudinally interconnected to two monocoque stressed-skin wing modules.

7. The apparatus of claim 1 wherein the parabolic bows at the ends of said module are adapted to receive and fasten to a means for transferring torque to said module.

8. The apparatus of claim 7 wherein said means for transferring torque to said module is a torque transfer arm.

9. The apparatus of claim 8 wherein said torque transfer arm is adapted to engage an external drive means.

10. A monocoque parabolic solar collector as defined in claim 1 assembled with other than blind fastening systems.

11. The parabolic solar collector of claim 1 wherein said interior parabolic mirror channel comprises a reflective material laminated thereto.

12. The parabolic solar collector of claim wherein said parabolic mirror channel comprises at least one reflective panel attached thereto.

13. The parabolic solar collector of claim 12 wherein said reflective panel is attached to said parabolic mirror channel by claiming means.

14. A monocoque stressed-skin focusing reflector structure for solar energy collector comprising: a plurality of sheet-like stressed interior channel members having a generally concave reflective front surface and rearwardly extending channel return edges along the opposite curved edges thereof, a plurality of bow members, one disposed between each adjacent pair of said interior channel members with said return edges in surface contact with the major faces of said bows and the forward edges of said bows being contoured to lie along and follow the front surfaces of said interior channel members, said bows being attached to said return edges by connector means other than blind fastening systems, and a plurality of sheet-like stressed exterior channel members disposed between said bows rearwardly of said interior channel members, said exterior channel members having rearwardly-extending channel return edge member along their sides adjacent said bows with said edge members in surface contact with a major face of the adjacent bow, said edge members being attached to said bows by connective means other than blind fastening system.

* * * * *

UNITED STATES PATENT AND TRADEMARK OFFICE
CERTIFICATE OF CORRECTION

PATENT NO. : 4,423,719
DATED : January 3, 1984
INVENTOR(S) : Joseph A. Hutchison It is certified that error appears in the above-identified patent and that said Letters Patent are hereby corrected as shown below:

Column 2, line 31, change "casued" to -- caused --;

Column 2, line 53, change "porblem" to -- problem --;

Column 8, line 5, change "liminating" to -- laminating --;

Column 8, line 66, after "claim" add -- 1 --;

Column 9, line 5, change "collector" to -- collectors --; and

Column 10, line 8, change "member" to -- members --.

Signed and Sealed this

Twenty-seventh Day of March 1984

[SEAL]

Attest:

GERALD J. MOSSINGHOFF

Attesting Officer

Commissioner of Patents and Trademarks